US008824797B2

(12) United States Patent
Salamati et al.

(10) Patent No.: US 8,824,797 B2
(45) Date of Patent: Sep. 2, 2014

(54) GRAPH-BASED SEGMENTATION INTEGRATING VISIBLE AND NIR INFORMATION

(75) Inventors: Neda Salamati, Chavannes-pres-Renens (CH); Diane Larlus, Venon (FR); Gabriela Csurka, Crolles (FR); Craig Saunders, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 395 days.

(21) Appl. No.: 13/251,459

(22) Filed: Oct. 3, 2011

(65) Prior Publication Data

US 2013/0084007 A1    Apr. 4, 2013

(51) Int. Cl.
G06K 9/34 (2006.01)
G06K 9/62 (2006.01)
G06T 7/00 (2006.01)

(52) U.S. Cl.
CPC ..... G06T 7/0087 (2013.01); G06T 2207/20076 (2013.01); G06T 2207/10048 (2013.01); G06T 2207/20072 (2013.01); G06T 2207/20081 (2013.01); G06T 7/0093 (2013.01)
USPC .......................................... 382/173; 382/159

(58) Field of Classification Search
CPC ... G06T 7/0079; G06T 7/0081; G06T 7/0083; G06T 2207/20144; G06T 2207/10048; G06K 9/6256
USPC ......................... 382/159, 173, 180, 224, 305
See application file for complete search history.

(56) References Cited

U.S. PATENT DOCUMENTS

| 7,720,773 | B2 * | 5/2010 | Szummer et al. ............... 706/20 |
| 1,289,078 | A1 | 9/2010 | Sanchez et al. |
| 7,912,288 | B2 * | 3/2011 | Winn et al. .................... 382/181 |
| 8,009,921 | B2 | 8/2011 | Csurka |
| 8,213,726 | B2 * | 7/2012 | Kohli et al. .................... 382/226 |
| 8,249,349 | B2 * | 8/2012 | Blake et al. .................... 382/180 |
| 8,437,570 | B2 * | 5/2013 | Criminisi et al. ............. 382/257 |
| 8,724,866 | B2 * | 5/2014 | Wu et al. ....................... 382/128 |
| 2003/0021481 | A1 | 1/2003 | Kasutani |
| 2007/0052356 | A1 | 3/2007 | Kawauchi |
| 2007/0258648 | A1 | 11/2007 | Perronnin |
| 2008/0069456 | A1 | 3/2008 | Perronnin |
| 2008/0240572 | A1 | 10/2008 | Hoshii |
| 2008/0317358 | A1 | 12/2008 | Bressan |

(Continued)

OTHER PUBLICATIONS

Brown, et al. "Multi-spectral SIFT for Scene Category Recognition", CVPR, 2011, pp. 177-184.

(Continued)

*Primary Examiner* — Kanjibhai Patel
(74) *Attorney, Agent, or Firm* — Fay Sharpe LLP

(57) ABSTRACT

A method for segmenting an image includes extracting unary potentials for pixels of the input image. These can be based for each of a set of possible labels, on information for a first channel in the image, such as in the visible range of the spectrum. Pairwise potentials are extracted for neighboring pairs of pixels of the image. These can be based on information for a second channel in the image, such as in the infrared range of the spectrum. An objective function is optimized over pixels of the input image to identify labels for the pixels. The objective function is based on a combination of ones of the extracted unary and pairwise potentials. The image is then segmented, based on the identified pixel labels. The method and system can provide an improvement in segmentation over methods which use only the visible information.

22 Claims, 10 Drawing Sheets

(56) References Cited

U.S. PATENT DOCUMENTS

| | | | |
|---|---|---|---|
| 2009/0144033 A1 | 6/2009 | Liu | |
| 2009/0208118 A1 | 8/2009 | Csurka | |
| 2010/0040285 A1 | 2/2010 | Csurka | |
| 2010/0092084 A1 | 4/2010 | Perronnin | |
| 2010/0092085 A1 | 4/2010 | Marchesotti | |
| 2010/0098343 A1 | 4/2010 | Perronnin | |
| 2010/0189354 A1 | 7/2010 | de Campos | |
| 2010/0191743 A1 | 7/2010 | Perronnin | |
| 2010/0226564 A1 | 9/2010 | Marchesotti | |
| 2010/0318477 A1 | 12/2010 | Perronnin | |
| 2011/0026831 A1 | 2/2011 | Perronnin | |
| 2011/0040711 A1 | 2/2011 | Perronnin | |
| 2011/0052063 A1* | 3/2011 | McAuley et al. | 382/180 |
| 2011/0091105 A1 | 4/2011 | Perronnin | |
| 2011/0192587 A1 | 8/2011 | Lima | |
| 2012/0269436 A1* | 10/2012 | Mensink et al. | 382/180 |

OTHER PUBLICATIONS

Csurka, et al. "An Efficient Approach to Semantic Segmentation", Int J. Comput Vis, 2011, vol. 95, pp. 198-212.

Perronnin, et al. "Fisher Kernels on Visual Vocabularies for Image Categorization", CVPR '07, Jun. 17-22, 2007 pp. 1-8.

Salamati, et al. "Material-based Object segmentation using near-infrared information", In Proc. of the IS&T/SID Color Imaging Conference 2010, pp. 1-6.

Salamati, et al. "Material classification using color and NIR images", Proceedings of IS&T/SID, 2009, pp. 1-7.

Salamati. "Material classification using NIR and Visible Images", Proceedings of IS&T/SID, 2009 pp. 165-169.

Kang, et al., "Road scene labeling using SfM module and 3D bag of textons," 2009 IEEE 12th International Conference on Computer Vision Workshops, pp. 657-664 (2009).

Salamati, et al., "Analyzing near-infrared images for utility assessment," Human Vision and Electronic Imaging XVI, SPIE vol. 7865, No. 1, pp. 1-9 (2011).

Panagopoulos, et al., "Estimating Shadows with the Bright Channel Cue," Trends and Topics in Computer Vision, pp. 1-12 (2010).

Arif, et al., "Visual tracking and segmentation using Time-of-Flight sensor," International Conference on Image Processing, pp. 2242-2243 (2010).

Shotton, et al., "TextonBoost: Joint Appearance, Shape and Context Modeling for Multi-class Object Recognition and Segmentation," Computer Vision-ECCV: 9th European Conference on Computer Vision, pp. 1-15 (2006).

* cited by examiner

GRAPH-BASED SEGMENTATION INTEGRATING VISIBLE AND NIR INFORMATION

BACKGROUND

The following relates to image processing, image retrieval, image archiving, and related arts. It finds particular application in a system and method for segmenting an image into two or more regions, based on multiple sources of information, such as visible and infrared (IR) information.

Automated tagging or classification of images is useful for diverse applications such as image archiving, image retrieval, and so forth. In a typical approach, the image is represented by a high level image signature that is often based on cumulating local information. These image signatures are then used as inputs to a trained classifier that outputs a class label (or vector of class label probabilities, in the case of a soft classifier) for the image.

For many applications involving images, such as photographic images or visual documents, it is desirable to go beyond tagging and to perform image segmentation. This can be used for better understanding of a scene or for locating and segmenting a particular object (e.g., the license plate of a car, a particular soft-drink can, identifying and counting different products on shelves in a store, etc.). The segmentation may involve segmenting the entire image according to class labels, such as sky, road, people, buildings, tissue types, etc. For example, pixel-level masks may be created where each pixel is assigned a label.

Object segmentation tends to be a difficult task, since images often include background information which can be confused with an object of interest. A variety of approaches have been proposed. Many of these rely on detecting contours in the image, in order to estimate the most likely object border for an object of interest. For example, graph based methods have been used, which incorporate a recognition part (in which object is this pixel?) and a regularization part, in which neighboring image pixels are urged to belong to the same region (e.g., object or background). The regularization part can also include some of the contour information.

Such segmentation algorithms are still prone to errors in the presence of a cluttered background, or distracting objects. Even when the objects themselves can be successfully recognized, the contour of the objects can be confused with strong edges coming from the background clutter, or any distracting objects.

The exemplary embodiment provides a system and method for object segmentation which employs different sources of information to improve the segmentation process.

INCORPORATION BY REFERENCE

The following references, the disclosures of which are incorporated herein in their entireties by reference, are mentioned:

The following relate generally to image segmentation and classification: U.S. Pub. No. 20110052063, published Mar. 3, 2011, entitled CONSISTENT HIERARCHICAL LABELING OF IMAGE AND IMAGE REGIONS, by Julian McAuley, et al., discloses a method for classification of image regions by recursively partitioning an image into a tree structure in which nodes are defined by the image regions and edges are defined by pairs of nodes connected by edges of the tree. Unary classification potentials are assigned to nodes of the tree and pairwise classification potentials to edges of the tree. The image regions of the tree are labeled based on optimizing an objective function which aggregates the unary classification potentials and the pairwise classification potentials.

U.S. Pub. No. 20100092085, published Apr. 15, 2010, entitled CONTENT-BASED IMAGE HARMONIZATION, by Luca Marchesotti, discloses a harmonization system and method in which images are automatically segmented into foreground and background regions. The segmenting may be category dependent, allowing object-specific techniques to be applied.

U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al., discloses a method for class-based segmentation of a digital image. Patches of an image are extracted and features are extracted from the patches. For each patch, relevance score are computed for various object classes. These scores are transferred to pixels of the image and an object class is assigned to the pixels, allowing the image to be segmented and the segments labeled, based on object class.

Image categorization methods are also disclosed in U.S. application Ser. No. 13/090,378, filed on Apr. 20, 2011, entitled LEARNING STRUCTURED PREDICTION MODELS FOR INTERACTIVE IMAGE LABELING, by Thomas Mensink, et al., U.S. Pub. No. 20090208118, published Aug. 20, 2009, entitled CONTEXT DEPENDENT INTELLIGENT THUMBNAIL IMAGES, by Gabriela Csurka, U.S. Pub. No. 20070005356, published Jan. 4, 2007, entitled GENERIC VISUAL CATEGORIZATION METHOD AND SYSTEM, by Florent Perronnin.

Saliency detection methods are disclosed, for example, in U.S. Pub. No. 20100226564, entitled FRAMEWORK FOR IMAGE THUMBNAILING BASED ON VISUAL SIMILARITY, by Luca Marchesotti, et al., and in U.S. Pub. No. 20090208118 (now U.S. Pat. No. 8,009,921).

BRIEF DESCRIPTION

In accordance with one aspect of the exemplary embodiment, a method for segmenting an image includes receiving an input image to be segmented. For each label in a set of labels, the method includes assigning unary potentials for pixels of the input image. The unary potentials are based on information for a first channel in the image. For each of pairs of labels in the set of labels, the method includes assigning pairwise potentials for neighboring pixels of the image. The pairwise potentials are based on information for a second channel in the image, different from the first channel. An objective function is optimized over pixels of the input image to identify labels for pixels of the image from the set of labels. The objective function aggregates ones of the unary potentials and pairwise potentials. The input image is segmented into regions based on the identified labels. The method may be at least partially implemented by a processor.

In another aspect, a graph-based image segmentation system includes memory which is configured for storing a graphical representation of an input image. A unary component extracts unary potentials, over a set of labels, for pixels of the image, the unary potentials being based on information for a first channel in the image. A pairwise component extracts pairwise potentials for neighboring pixels of the image over the set of labels. The neighboring pixels are defined by the graphical representation. The pairwise potentials are based on information for a second channel in the image, different from the first channel. A segmentation component identifies labels for pixels of the image. The labels are selected from the set of labels. The identifying includes optimizing an objective function over pixels of the input image which is based on a combination of the unary and pairwise potentials and for segmenting the input image based on the identified labels. A processor implements the unary component, pairwise component, and segmentation component.

In another aspect, a graph-based image segmentation method includes receiving an image to be segmented, defining a graphical representation of the image in which pairs of neighboring pixels are identified by edges of the graphical representation, assigning unary potentials to pixels in the graphical representation, the unary potentials being based on information for a visible channel in the image, assigning pairwise potentials to the pairs of neighboring pixels of the graphical representation, the pairwise potentials being based on information for an infrared channel in the image, and identifying labels for pixels of the image. The labels are selected from a finite set of labels. The identifying includes optimizing an objective function over the pixels in the graphical representation, the objective function aggregating ones of the unary potentials and the pairwise potentials, given labels from the set of labels. The input image is segmented based on the identified labels. One or more of the defining, assigning unary potentials, assigning pairwise potentials, and identifying labels can be performed with a processor.

DETAILED DESCRIPTION

Figure 1:
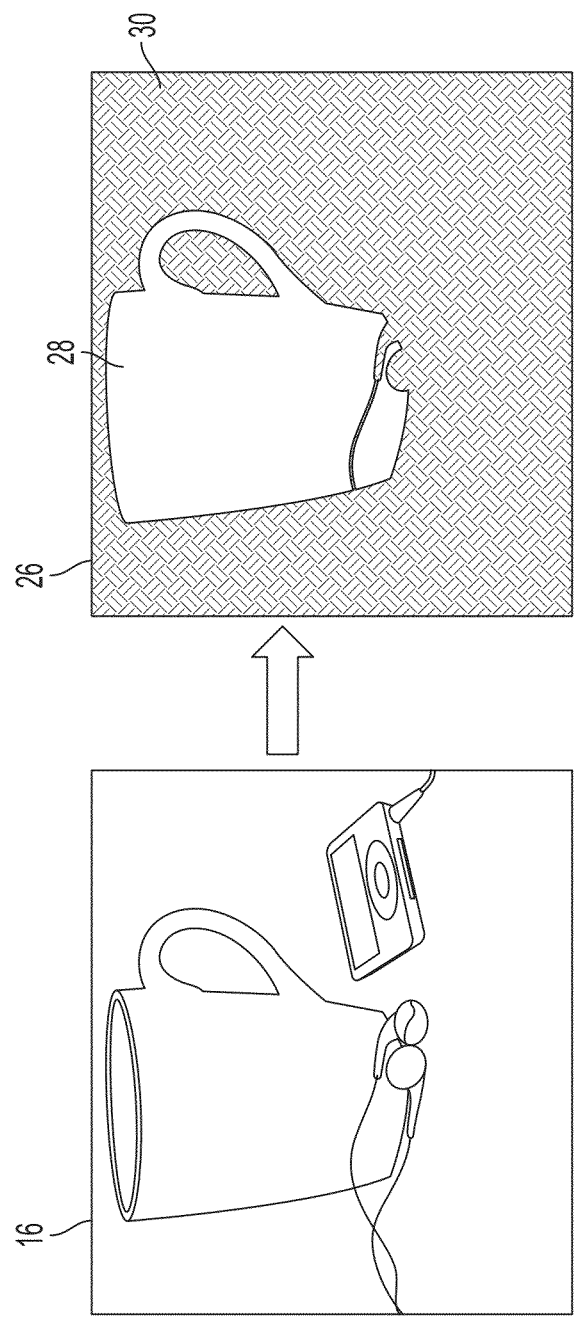
FIG. 1 illustrates segmentation of a photographic image.

Object segmentation aims to recognize and locate at the pixel level, different categories (labels) of objects (e.g., sky, road, building, etc.) or a particular object (e.g., a can of a particular brand of soft drink) in an image. For example, in FIG. 1, the segmentation of a cup (image mask) is shown in the right image, where the label "cup" (or foreground) is illustrated by white pixels and the label "not-cup" (or background) is illustrated by white pixels.

Aspects disclosed herein include a graph-based semantic image segmentation system for segmenting an image, a method of making the system, and a method of image segmentation which can be performed with the system. The exemplary system and method integrate complementary channels into the segmentation decision, such as visible and non-visible information. A graph representation of the image can be employed to represent the interaction between a first information channel (or simply "first channel", e.g., visible) and a second information channel (or simply "second channel" e.g., non-visible) on the prediction of a label for a pixel.

The first channel can include one or more channels in the visible range of the spectrum, i.e., corresponding to the range of wavelengths perceived by the human visual system, which is typically between 400 and 700 nanometers (nm). The first information channel can include, for example, red, green, and blue (RGB) channel information for each pixel in an image, although the visible information can be expressed in any suitable three or more color space, such as RGB, or a luminance-chrominance color space, such as L*a*b*, YCbCr, or the like, in which different colors in the visible range can be represented. While the exemplary first channel information is described in terms of RGB values (i.e., the first information channel includes three channels), it is to be appreciated that the first channel information may include information fewer than three channels such as one in the case of black and white (monochrome) images, or when fewer than all of the RGB channels are used. In particular, the visible information can be the standard information used in pictures that are taken with a digital camera and often stored in photo-collections.

The second channel can include one or more channels in the non-visible range of the spectrum, i.e., corresponding to a range of wavelengths that are not perceived by the human visual system. The exemplary second channel comprises wavelengths in the infrared (IR) range of the spectrum, which corresponds generally to the wavelength range of 700 nm-1 mm. In particular the wavelength range of the second channel is less than 5000 nm or less than 3000 nm, such as in the near infrared (NIR) region of 700-1400 nm.

The exemplary first and second channels are complementary, i.e., their wavelength ranges do not overlap. However, in other embodiments, the wavelength ranges may be partially overlapping. In this case, at least one of the wavelength ranges of the first and second channels includes wavelengths of the electromagnetic spectrum which are not in the other of the first and second channels, such that different information is associated with the image pixel for the first and second channels.

The information in the first and second channels can be expressed in the form of grayscale values. In general, "grayscale" refers to the optical or other signal density value of any single channel, however expressed (L*a*b*, RGB, IR channel, etc.).

As used herein a pixel generally denotes a "picture element" and encompasses image elements of two-dimensional images or of three dimensional images. Where reference is made herein to "a pixel", it is to be appreciated that a group of neighboring pixels (generally no more than 64 pixels, or no more than 1% of the image) may be considered as a single pixel for ease of computation. Thus, for example, visible and near infrared representations of the image can be considered at a higher level than single pixels, such as at a patch level, superpixel or any other grouping or multi-scale combination of pixels.

In other embodiments, an input original image may be preprocessed to reduce the pixel resolution, thus a pixel in the input image to be processed by the method may correspond to a group of pixels in the original image. For convenience, the word "image" is used herein to refer to the image at any stage of processing.

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

The exemplary method/system disclosed herein can include the following elements:

1. More than one source of information for each pixel in an image.

2. A graph-based representation of the image, given the different information sources.

3. An objective function defined on the graph-based representation.

4. A solution for the objective function by optimizing (e.g., minimizing) the objective function.

The combination of these elements can be used alone, or in combination with other segmentation methods, for image segmentation. The exemplary method allows the capture and use of the unique benefits of each source of information, by taking into account their different characteristics.

Figure 2:
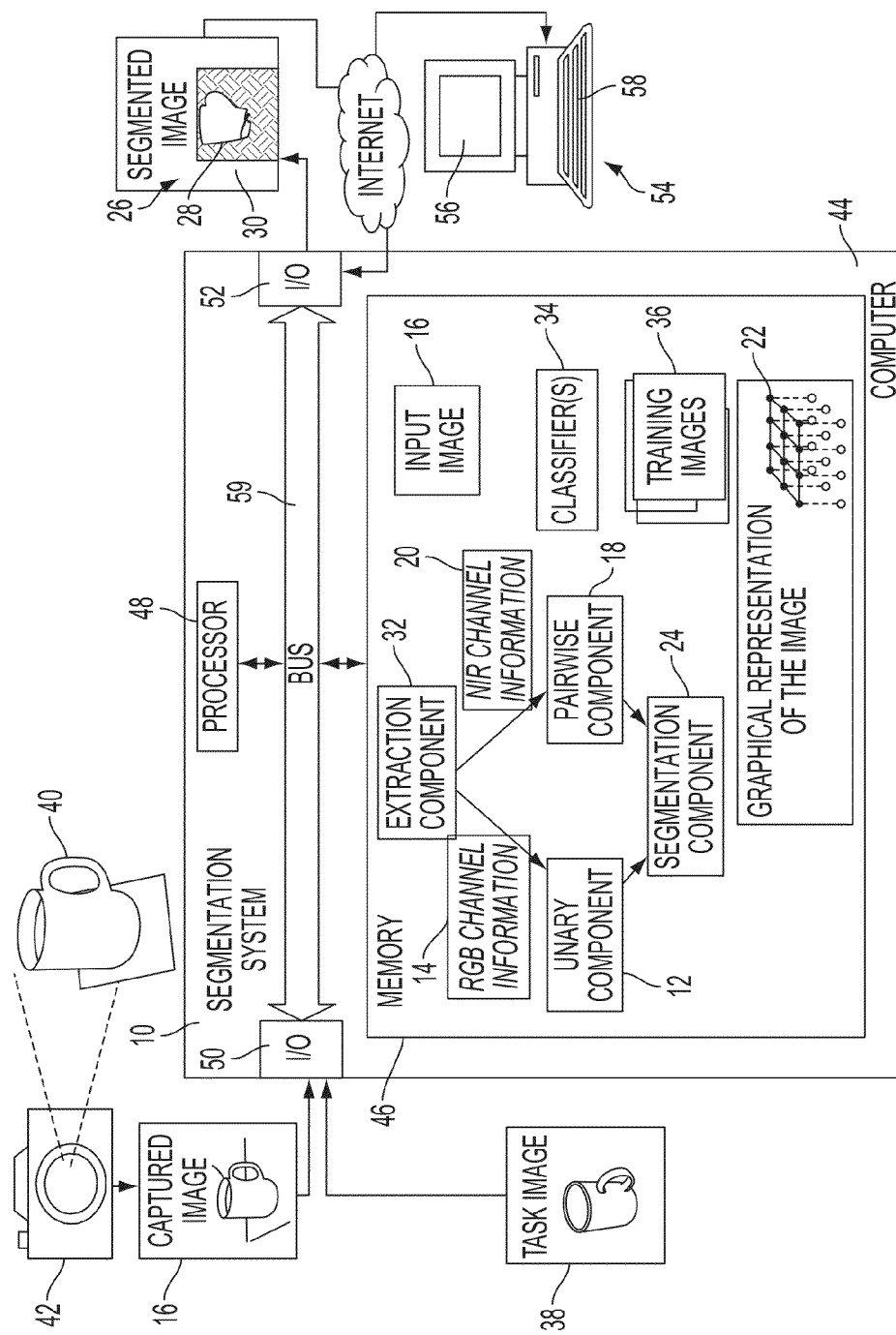
FIG. 2 is a functional block diagram of an environment in which a system (apparatus) for segmenting an image operates in accordance with one aspect of the exemplary embodiment.

FIG. 2 illustrates an exemplary image segmentation system 10. The system 10 includes a first (unary) component 12, which provides unary potentials for pixels of the image, based on first channel (e.g., visible) information 14 extracted from an input image 16. A second (pairwise) component 18 of the system provides pairwise potentials for pixel neighbors, based on second channel (e.g., non-visible) information 20 extracted from the image 16. A graphical representation 22 of the image 16, in which pixel neighbors (e.g., pairs) are identified, is based thereon. The pixel neighbors are generally pairs of direct neighbors, rather than indirect neighbors that are spaced from each other by one or more pixels. The pairwise potentials can be binary and/or higher order energy terms. The exemplary optimization function optimizes an aggregation of these unary and pairwise potentials, respectively, of some or all the pixels in the image. It is to be appreciated that the optimization function may be based on additional information.

A segmentation component 24 segments the image into semantically labeled image segments (regions) by optimizing (e.g., minimizing) the objective function, given a finite set of labels which includes at least two semantic labels. The output of the system can be a segmented image 26 (or information derived therefrom), in which non-overlapping regions 28, 30 of the image 26 are labeled with different semantic labels from the set of labels. An extraction component 32 extracts the channel information 14, 20 from the image 16.

In FIG. 1, for example, the two labels are illustrated by using black to show the object pixels in the segmented image 26 (regions 28) and white to show the non-object pixels (region 30), although it is to be appreciated that the labels may be stored in any form. As will be appreciated, while images are shown herein in black and white for ease of reproduction, the exemplary input images 16 include both visible (e.g., two or three color channels) and non-visible (e.g., NIR channel) information.

In one embodiment, the semantic labels correspond to object classes. In this embodiment, the unary potentials can be based on information (e.g., class scores) provided by one or more local image region classifiers 34, which has/have been trained on features extracted from a labeled set of training images 36. The classifier can be an object classifier in which the training images include regions of pixels that are labeled with the relevant class(es). In other embodiments, the classifier can be a saliency based classifier which classifies regions of pixels based on their saliency. The unary potentials, in this case, are based on the saliency scores provided by the salient region classifier. In another embodiment, the semantic labels can correspond to the labels relevant and non-relevant according to a given task image 38 (a different image from the input image, which is used as a template). In this embodiment, the label "relevant" means that the pixel is belonging to a given object instance. The unary energy terms can be provided, in this case, by an instance likelihood map. In other embodiments, the unary potentials are based on an object map derived from user-selected areas of an image considered as being part of the object. In each of these embodiments, the unary potentials are based on the first channel (e.g., RGB color channel) information and not on the second channel (e.g., NIR) information. Further details on these aspects are provided below.

The image 16 can be a photographic image of a real world object 40, such as a landscape, seascape, urban scene, person or people, vehicle, local object such as a document, license plate, or any combination thereof. The image can be captured by any suitable image capture device 42, such as a digital still or video camera, cell phone with built-in camera, or the like, which is capable of capturing the first and second channels. In general, the image capture device 42 includes one or more sensors which convert light or other electromagnetic energy into electrical signals. The sensors can include, for example, separate or combined visible and near infrared sensor(s). In other embodiments, one or more of full infra-red, multi-spectral sensors, and/or range sensors may be employed in place of or in addition to visible and near infrared sensors. In the exemplary embodiment, the two complementary channels (the visible (standard image) information and the NIR channel), are captured by a conventional digital camera. It is therefore assumed that, for each image 16 to segment, these two channels are available.

The exemplary segmentation system 10 is hosted by one or more computing devices 44, such as a PC, such as a desktop, a laptop, palmtop computer, portable digital assistant (PDA), server computer, cellular telephone, tablet computer, pager, combination thereof, or other computing device capable of executing instructions for performing the exemplary method. In one embodiment, the segmentation system 10 is hosted by the image capture device 42.

The illustrated computing device 44 includes memory 46, which stores the components 12, 18, 24, 32 as software instructions, as well as the input image 16, task image 38 and/or classifier(s) 34, optionally, training images 36, and graphical representation 22 during processing. A processor 48, such as the computer's CPU, implements the components

12, 18, 24, 32, i.e., executes the software instructions, during the performance of the exemplary method described below. The computer 44 includes one or more input/output interface devices 50, 52 for receiving the images 16, 36, 38 from an external device, such as a computer or memory storage device, and for outputting a segmented image 26 and/or information based on the segmented image 26, to an external device, such as a computer 54 or memory storage device. The external device 54 may be linked to the computer 44, e.g., via a wired or wireless connections such as a local area network or wide area network, such as the internet. In one embodiment, computer 54 includes a display device 56 for displaying the input image 16 to a user and a user input device 58, such as a keyboard, keypad, touch screen, cursor control device or combination thereof for interactive definition of a region of visual interest in the image, by the user, in accordance with one aspect of the exemplary embodiment. Hardware components 46, 48, 50, 52 may be communicatively connected by one or more data/control bus(es) 59.

The memory 46 may represent any type of non-transitory computer readable medium such as random access memory (RAM), read only memory (ROM), magnetic disk or tape, optical disk, flash memory, or holographic memory. In one embodiment, the memory 46 comprises a combination of random access memory and read only memory. In some embodiments, the processor 48 and memory 46 may be combined in a single chip. The interface 56, 58 allows the computer to communicate with other devices directly or via a computer network, such as a local area network (LAN) or wide area network (WAN), or the internet, and may comprise a modulator/demodulator (MODEM), USB port, disk drive or the like.

The digital processor 48 can be variously embodied, such as by a single-core processor, a dual-core processor (or more generally by a multiple-core processor), a digital processor and cooperating math coprocessor, a digital controller, or the like. The digital processor 48, in addition to controlling the operation of the computer 44, executes instructions stored in memory 46 for performing the method outlined in FIG. 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 44. Since the configuration and operation of programmable computers are well known, they will not be described further.

Figure 3:
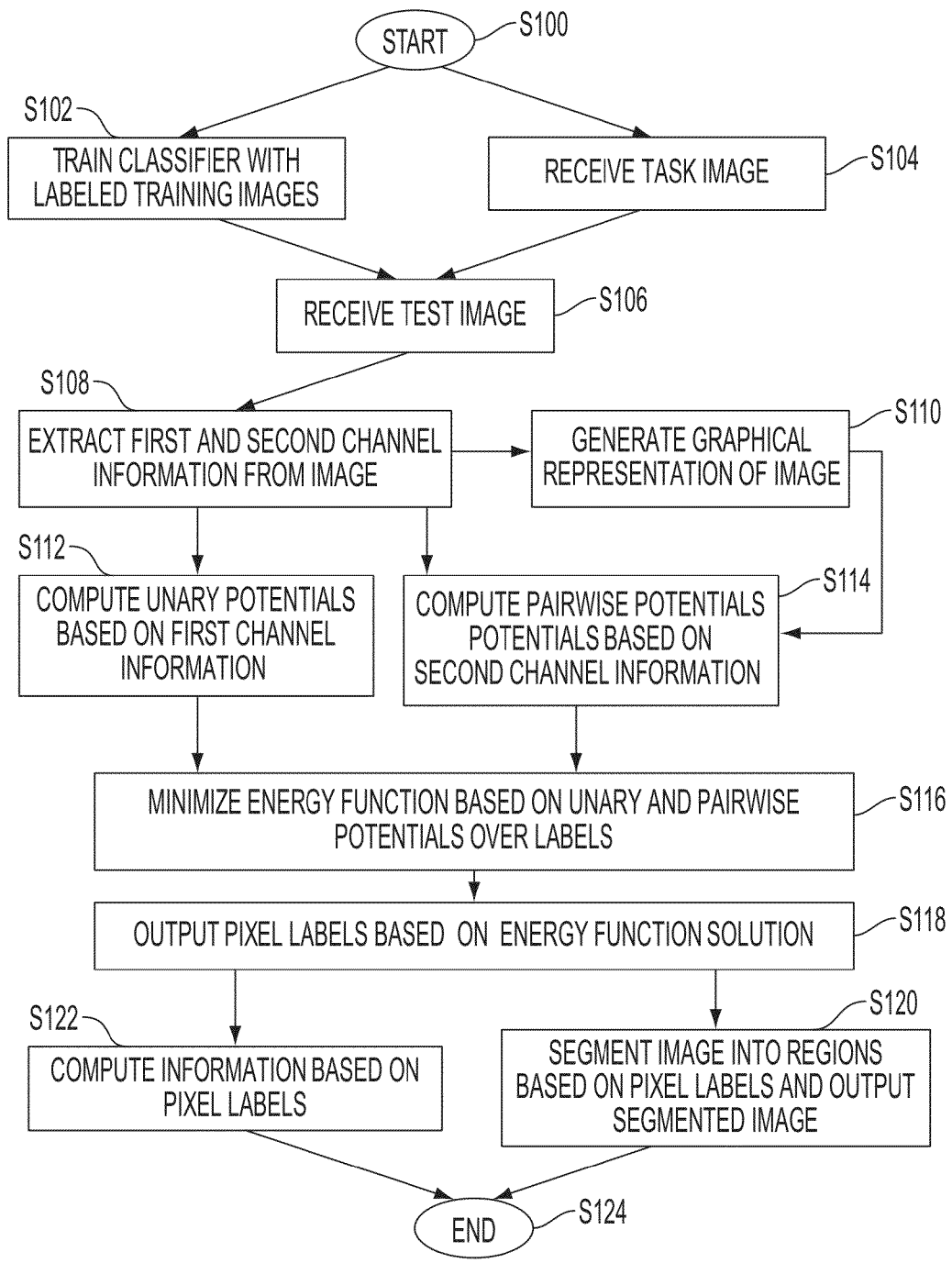
FIG. 3 is a flow chart which illustrates a method for segmenting an image in accordance with another aspect of the exemplary embodiment.

With reference now to FIG. 3, exemplary segmentation methods are illustrated. The exemplary method uses a segmentation algorithm (segmentation component 24) which applies a graph-based model to represent images, which combines information from different sources in order to produce the segmentation. As will be appreciated, the steps of the method need not all proceed in the order illustrated and fewer, more, or different steps may be performed. The method begins at S100.

At S102, a classifier 34 (e.g., one for each of a set of object classes) is optionally trained on visible information from a set of labeled training images 36.

Alternatively, at S104, a task image 38 is optionally input. The task image may have been labeled (e.g., manually) with relevant and non-relevant regions. Or the task image can be unlabeled to be used directly, as a whole to find regions containing the same object in the test image 16. Alternatively, a rough saliency classifier can be used to identify the relevant regions, for example, using the NIR information (or visible information).

At S106, a test image 16 to be segmented is input. Preprocessing of the image 16 may be performed, such as reducing the pixel resolution.

At S108, first channel information (e.g., visible, such as R, G, and/or B channel information) and second channel information (e.g., NIR) is extracted from the image 16 for each pixel of the image (or at least for a representative subset thereof which are to form the graphical representation), e.g., using extraction component 32.

At S110, a graphical representation 22 of the image is generated, e.g., by the pairwise component 18, which identifies pairs of neighboring pixels through edges of the graphical representation.

At S112, unary potentials are assigned to the pixels in the graphical representation, for each of the possible labels in a set of two or more labels. The unary potentials are based on information for the first channel in the image which, in various embodiments disclosed herein, is input to the trained classifier 36 or compared with task image 38.

At S114, pairwise potentials are assigned to the neighboring pairs of pixels in the graphical representation, for each of the possible pairs of the labels. The pairwise potentials are based on information for the second channel in the image. In various embodiments these are computed with a pairwise function which provides the lowest possible (optimal) value of the pairwise potential when the labels of the two neighboring pixels are the same and, if the labels are different, provides for the pairwise potential to decrease as a difference between the observed pixel values for the neighboring pixels in the second channel increases. Thus, for example, the pairwise function operates such that for a first pair of pixels whose labels are different, having a first difference between the observed pixel values in the second channel, the pairwise potential will be higher than for a second pair of pixels whose labels are different but which have a lower difference between the observed pixel values in the second channel.

At S116, an objective function (energy function) is optimized. The objective function is one which aggregates the unary potentials and the pairwise potentials. In particular, the objective function is an optionally weighted combination of the unary and pairwise potentials which is optimized, e.g., minimized, by the segmentation component 24, over the set of possible labels. In the optimization, the segmentation component may provide an exact or an approximate solution to the objective function optimization problem.

At S118, the pixel labels corresponding to the optimized objective function are output.

At S120, the image 16 is segmented (e.g., by the segmentation component 24) into regions based on the labels computed at S118. The regions can be labeled as foreground (corresponding to the object being recognized) and background (the rest of the image), in the case were there are only two classes (object and not object), or may be labeled according to object class (e.g., building, sky, person, etc.) where there are more than two classes.

At S122, in one embodiment, the segmentation (e.g., pixel labels) may be used in a further process. For example, a section of an image (e.g., a rectangular area), which includes a region which has been labeled as a license plate or other object of interest, is extracted from the image 16. This section can be subjected to OCR or other recognition processing to identify the alphanumeric characters which make up the license number or may be otherwise processed, depending on the type of object extracted. This information may be output from the system. The method ends at S124.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for segmenting an image.

Further details on the system and method will now be provided.

Selection of First and Second Channels

It has been found that objects often have a very discriminant appearance in the visible radiation spectrum, and color/visible information is thus well suited for the recognition of objects and their coarse localization. However, it has been found that color can be misleading, so the exemplary embodiment uses additional information, such as NIR information, that can be captured by standard digital cameras, thus providing an inexpensive source of additional information. Traditional photographic cameras record radiation in a range that matches the spectrum of light visible to the human eye. The silicon sensor captures radiation in a larger range, in particular in a region of the near-infrared (NIR) domain (700 nm-1100 nm). It has been found that an object's material is better captured by near infrared information. This may be because NIR radiation generally penetrates deeper into the object surface and can capture some of the material characteristics. For example, fabric responds differently to NIR compared with hard surfaces and faces. Consequently, the changes in intensity in the NIR domain are not due to color variations, but to material and illumination changes. This can aid segmentation where color distractions occur (for example, due to noisy background, color variations within the object, or almost no color border between an object and the image background).

In the exemplary embodiment, the information available in the NIR domain is used to obtain better segmentation. The visible and the NIR information is used in a joint graph based model. The visible image is used to efficiently recognize and roughly locate the object of interest in the image. The NIR image is used to precisely extract the object pixel-level location, using the material dependency of the NIR response.

While NIR information has previously been combined with color information for preprocessing (for example, for removing shadows), standard (low-level) segmentation methods have been thereafter used (based on visible pixel information only). In other methods, NIR has been treated as an extra channel and a standard (low-level) segmentation pipeline applied on an augmented representation. The present embodiment uses a different approach, by using an energy minimization method that allows the unique benefits of each channel to be captured and used. The exemplary method takes into account the different behaviors and characteristics of each source of information to integrate them in a more effective manner. In particular, the visible information is used to efficiently recognize and roughly locate the object of interest in the image, while the NIR information is used in the objective function to compute pairwise potentials to guide the refined localization. The two types of information (potentials) are jointly used to find the best labeling of the segmented images.

Extracting First and Second Channel Information from the Image (S108)

In some embodiments, the camera 42, or other acquisition device, outputs information for each channel and thus the extraction performed by component 32 simply involves separating the information for the first and channels, e.g., separating the R, G, and B channel information from the NIR channel information. In other embodiments, the image capture device may output a single channel which covers both regions of the spectrum, in which case, the extracting may include separating information from the single channel information in the two wavelength ranges of choice. In some embodiments, the wavelength range covered by the image capture device for one or both of the first and second channels may be wider than is desired for optimal segmentation. In this case, the extraction may include excluding information from wavelengths which are outside the desired first and/or second channel wavelength ranges.

Graphical Representation of the Image

Figure 4:
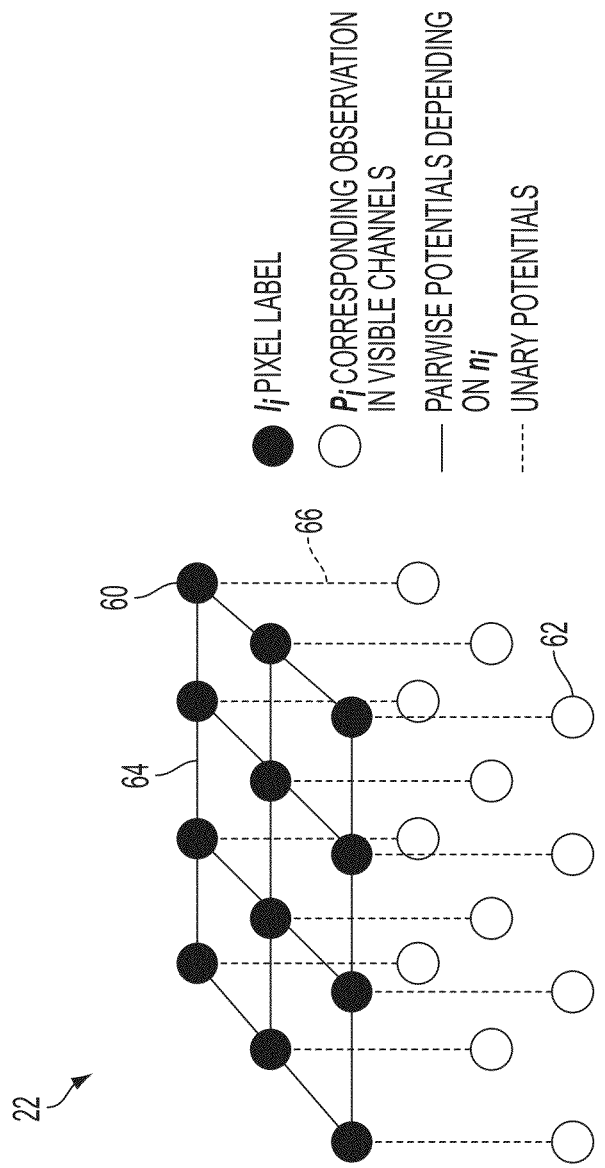
FIG. 4 illustrates a graphical representation of an image.

FIG. 4 shows an exemplary graphical representation 22 of the image as a graph over its pixels. Nodes 60 (shown as filled circles ●) in the graph represent the labels of the pixels (these are estimated values). Nodes 62 (shown as unfilled circles ○) represent the observations. Note that these observations contain information from multiple sources (visible and NIR). The edges 64 (solid lines) are associated with weights (pairwise potentials) which depend on observations from neighboring pixels. The dashed lines 66 represent the unary potentials, which depend only on the visible part of the observations. As will be appreciated, an image contains many more pixels than are illustrated by this simplified representation. A graph, as will be appreciated, represents relationships between pixels whereby every pixel is connected with every other pixel (directly or indirectly) through the graph. Generally, each pixel is connected with 4 neighbors directly (except at the boundaries of the graph); however graphs are contemplated where a pixel is directly connected with more than 4 pixels.

In the exemplary embodiment, the graph 22 is defined over the entire image. Each node 60 is associated to a pixel. Let G represent the graph, and V the nodes 60, where V={1, ..., N} and N is the number of pixels. As previously noted, each pixel can correspond to a single pixel or to a group of pixels in the original image 16.

Neighboring pixels are connected in the graph by edges 64. The level of connectivity selected provides for at least two or at least three neighboring pixels to be connected to each pixel by an edge 64 (except for the pixels at the four borders of the image, which can be ignored or treated differently). FIG. 4 illustrates the case of 4-connectivity (a 4-neighborhood graph), where for each pixel, the four most closely connected pixels are considered as its neighbors. In other embodiments, 8-connectivity may be considered. The graph is fully defined as G=(V,K), where K is the set of neighbors (pairs of neighboring pixels) represented by the edges 64 in the graph, i.e., (i,j)∈K if and only if two pixels i and j are neighbors.

The segmentation is viewed as a graph labeling problem. The simplest case is the case of binary segmentation (foreground/background). This means that pixels are to be labeled either as positive (foreground) or negative (background). This can be extended to a multi-class problem, in order to segment several objects simultaneously. The segmentation is fully defined by the set of labels L={$l_i$, 1≤i≤N}, with $l_i$∈{1, ..., C} where C is the number of classes and $l_i$ is the label of a pixel i.

Objective Function

At S116, an objective function is defined over the graph of labels 22. In one embodiment, the objective function is represented as follows:

$$E(L) = \sum_{i \in V} u_i(l_i) + \lambda \sum_{(i,j) \in K} v_{i,j}(l_i, l_j) \quad (1)$$

Each possible joint labeling of all the pixels corresponds to an energy value E(L). The optimization of this objective function outputs the set of labels L producing the optimum, e.g., minimum, value of the energy E(L) as the solution of the labeling problem.

The objective function is composed of two complementary parts (energy terms):

1. A unary term $\sum_{i \in V} u_i(l_i)$, and

2. A pairwise term $\sum_{(i,j) \in K} v_{i,j}(l_i, l_j)$.

λ is an optional weighting parameter that allows control of the relative influence of the two terms. Its value may be learned from the training data 36 and/or tested and modified using a validation set, to obtain a suitable value. For example λ has a positive value of greater than 0 such that the pairwise term has at least some influence on the assignment of labels to the pixels, such as λ is at least 0.1. If λ=1, the two terms are equally weighted.

The unary term is the sum over all nodes (pixels in the representation 22) of the cost $u_i(l_i)$ of assigning a label $l_i$ to a given pixel i. This term corresponds to the recognition part of the model. The unary term is dependent on the observations in the visible channel(s), i.e., is computed on visible information only, which is more discriminant for many objects. In the exemplary objective function, in which the object is to minimize the energy, this is an energy term that the model seeks to minimize. Each $u_i(l_i)$ can be seen as a penalty term, the cost of assigning pixel i to label $l_i$. Various methods for computing the unary potentials $u_i(l_i)$, based on the visible observations assigned (e.g., the pixel's gray values of each of the R, G, and B channels) are described below.

The pairwise term expresses the sum over all neighbors (i,j) of the cost of assigning a pair of labels ($l_i,l_j$) to neighbors (i,j). This term is based on the near infrared information, as described below.

As will be appreciated, the two terms can each be based on additional information, such as a combination of visible and infrared information in one of the terms, and/or the optimization function may include additional terms.

Energy Minimization (S116)

The solution of the segmentation problem is given by a set $\hat{L}$={$\hat{l}_i$, 1≤i≤N} of assigned labels $\hat{l}_i$ where $\hat{l}_i$∈{1, ..., C} for which $$\hat{L} = \arg\min E(L) \quad (2)$$

That is, in the exemplary embodiment, the solution corresponds to the lowest value of Equation (1). Since an exhaustive search of the best labeling is in general intractable because of the eventual enumeration of all possible annotations on the element graph 22, an approximation method can be used to compute an approximate joint labeling solution $\hat{L}$. For example, the Gibbs sampling method or graph-cut method can be used. These methods create dependency networks that approximate the joint probability as a set of conditional distributions and thus avoid the exact evaluation of the joint probability in graphical models. See, for example, Jordan, et al., "An Introduction to Variational Methods for Graphical Models," Machine Learning, 37(2): 183-233 (1999); and J. Neville and D. Jensen, "Collective Classification with Relational Dependency Networks," in Proc. ACM KDD (2003). See also, U.S. Pub. No. 20090157572, the disclosure of which is incorporated herein by reference in its entirety. The graph cut method can yield an exact solution in the case of binary labels but where pixels can be labeled with more than two different labels, an exact solution is not generally possible, but the solutions produced are usually near the global optimum.

Computation of Pairwise Potentials (S114)

The pairwise potential $v_{i,j}(l_i,l_j)$ for two pixel neighbors (i,j) is the cost of assigning a pair of labels ($l_i,l_j$) to neighbors (i,j). This term is responsible for the regularization in the model: neighboring pixels are encouraged to share the same label (avoiding noise in labeling). Thus, for example, if the possible labels are binary: $l_i$∈{1,0}, the regularization term $$\sum_{(i,j) \in E} v_{i,j}(l_i, l_j)$$

promotes the label pairs (0,0) and (1,1) and discourages (but does not prevent) the label pairs (0,1) and (1,0), i.e., assigns a lower cost when the labels are in agreement. However, this term is also responsible for aligning the segmentation with the object borders, where there is desirably a distinct change from one label to another, i.e., the labels of neighboring pixels can disagree at the point where one region changes to another. To ensure both properties, in one embodiment, a Potts model can be employed as a pairwise function.

By way of background, the Potts model is a generalization of the Ising model. Not only does it penalize neighboring pixels which are in disagreement with respect to their labels (as in the Ising model) but the penalty terms depend on the intensity of the difference in the observations. The greater the pixel value difference, the smaller the penalty. This has the effect of lowering the constraints next to image contours. It produces a regularized segmentation, with region borders following the contours. The Potts method, if applied for determining the pairwise potentials using visible only information, can be written as the following:

$$v_{i,j} = \delta_{l_i,l_j} \exp(-\beta \|p_i - p_j\|^2) \quad (3)$$

where $p_i$ denotes the RGB vector describing pixel i,
$\delta_{l_i,l_j} = 1$ if $l_i \neq l_j$, $\delta_{l_i,l_j} = 0$ otherwise, and
$\beta > 0$ (since if $\beta = 0$, this corresponds to the Ising Model)
In one embodiment, $\beta$ is set to:

$$\beta = \frac{1}{2\langle \|p_i - p_j\|^2 \rangle},$$

where $\|p_i - p_j\|$ is the difference (e.g., Euclidian or other vector distance) between the vectors of two neighboring pixels and $\langle \, \rangle$ is the expectation over the image, which can be the average (e.g., mean) of the value $\|p_i - p_j\|$ over all pixels. See, for example, Y. Boykov and M.-P. Jolly, "Interactive graph cuts for optimal boundary and region segmentation of objects in N-D images," in *Proc. IEEE Int Conf. on Computer Vision*, 2001.

When applied to visible images, the Potts model gets strongly distracted by pattern and color changes that appear in the scene.

In the exemplary embodiment, therefore, the Potts model is applied only in the NIR image, where stronger edges are better aligned with the actual object contours, due to the material-recognizing properties in NIR. In the exemplary model, therefore Equation (4) replaces Equation (3), as follows:

$$v_{i,j} = \delta_{l_i,l_j} \exp(-\beta |n_i - n_j|^2), \quad (4)$$

where $n_i$ denotes the NIR value that characterizes pixel i,
$n_j$ denotes the NIR value that characterizes a neighbor pixel of pixel i,
$\delta_{l_i,l_j}$ is as above, i.e., is 0 if the two labels $l_i$ and $l_j$ are in agreement (same class) and 1 if they are not in agreement (different classes), and
$\beta$ is a normalizing parameter, for example, $$\beta = \frac{1}{2\langle |n_i - n_j|^2 \rangle}.$$

i.e., $v_{i,j} = \delta_{l_i,l_j} \exp\left(-\left(\frac{|n_i - n_j|^2}{2\langle |n_i - n_j|^2 \rangle}\right)\right)$ Equation (4) is thus the pairwise function used in the exemplary embodiment for computing the pairwise potentials. Since only one NIR channel is used in the exemplary embodiment, the observations $n_i$ are single (scalar) values, rather than vectors, and thus in Equation (4), $|n_i - n_j|$ is used, which is the absolute value of the difference between the two NIR observations. Thus, even if pixel j has a larger NIR value (intensity) than pixel i, the absolute value of the difference will be a non-negative number. It is to be appreciated that in the case of two or more non-visible channels, a vector difference can be computed, as in Equation (3).

In the exemplary embodiment, the same value of $\beta$ is used for computing each pairwise potential. In one embodiment, $\beta$ is computed over the test image 16 as a whole. For example, the absolute value of the difference between the NIR values for the two pixels, $|n_i - n_j|$, is computed for each pair of neighboring pixels in the image (or at least for representative portion thereof throughout the image). Then, $\langle |n_i - n_j|^2 \rangle$, which is the expectation over the image, is the squared average (e.g., mean) of all the computed $|n_i - n_j|$ values. In other embodiments, different values of $\beta$ could be computed for each of two or more different regions of the image. In yet other embodiments, other methods may be used for computing $\beta$. For example, rather than computing $\beta$ for the test image 16, a value of $\beta$ may be learned, e.g., prior to receiving the test image, using NIR information for a training set 36 of images, and stored in memory to be subsequently applied for each of a set of test images 16.

In the exemplary model therefore, the pairwise potential $v_{i,j}$ will be 0 if the two labels agree, i.e., $l_i = l_j$. This is the lowest possible cost. In the case where the two labels do not agree ($l_i \neq l_j$) the pairwise potential is a function of the difference between the observations in the NIR channel, such that the greater the difference between the NIR values, the lower is the cost of having labels of neighbors which are not in agreement.
Computation of Unary Potentials (S112)

The graph-based segmentation method constitutes a versatile tool which can be applied to many different segmentation tasks. The method is thus not limited to any particular method of computing unary potentials, based on the first channel (visible) information.

By way of example, in different embodiments, the unary potentials may be based on the output of a trained classifier 34, by comparing the test image 16 with a task image 38 which has been segmented into two or more regions, based on the labels which are to be applied (e.g., "cup" or "not cup", in the case of the task image shown in FIG. 1, or relevant/non-relevant). The task image 36 thus has at least as many regions as there are labels, with at least one region for each possible label. In other embodiments, the task image 38 is not manually or otherwise labeled prior to inputting into the system, but is directly used as a whole to find regions containing the same object in the test image 16.

For each of the examples below, the graph structure and energy minimization framework are the same as described above, with pairwise potentials being calculated from neighboring pixel values using only the NIR image. The only component which changes is in how the unary potentials (based on the visible image) are calculated.
Method 1: Category-Based Object Segmentation The semantic labels to be applied to the images can correspond to object classes in a finite set of object classes and the unary energy terms can be provided by one or more local image region classifiers.

Figure 5:
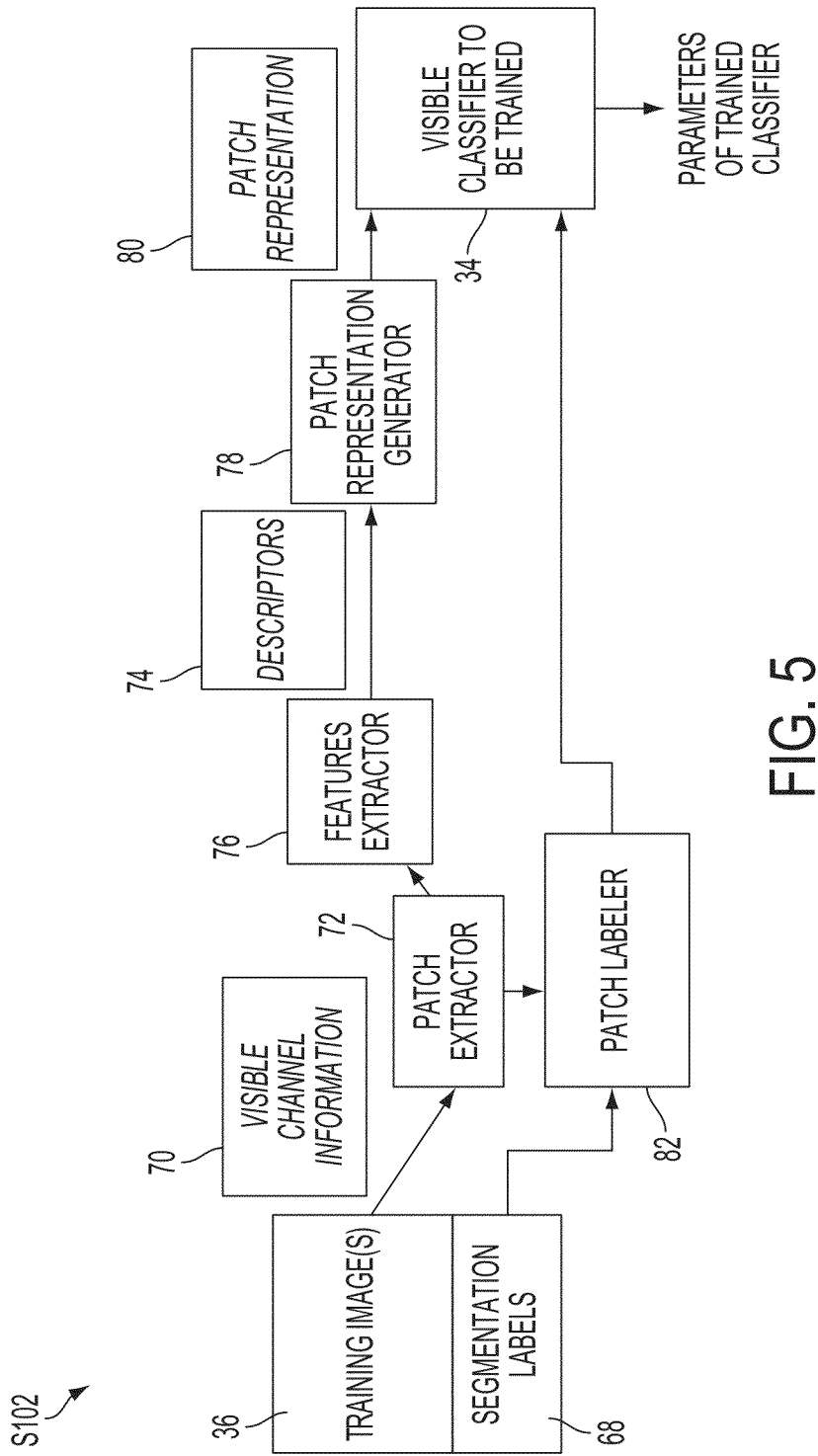
FIG. 5 is a block diagram illustrating training a classifier for use in generating unary potentials in the method of FIG. 3, in accordance with one aspect of the exemplary embodiment.
Figure 6:
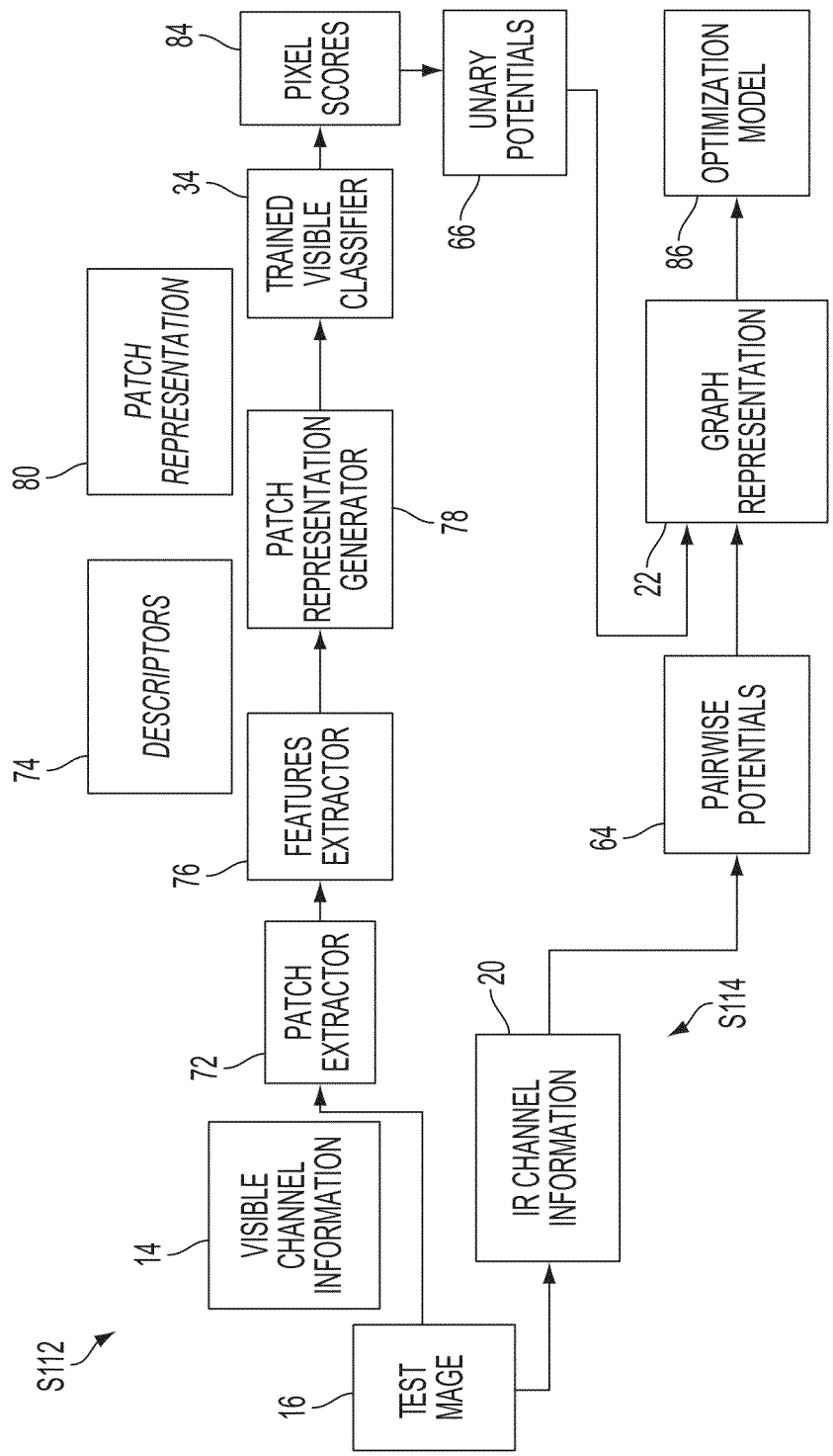
FIG. 6 illustrates use of the trained classifier in the segmentation method of FIG. 3.

In this embodiment, a preprocessing stage (learning) is used in which parameters of a classifier 34 are learned on labels (categories) of interest and the corresponding pixel values for the visible channels, or on extracted low level features based on the pixel values. This learned classifier 34 is then used to compute the unary potentials for the test image 16. FIGS. 5 and 6 illustrate the exemplary learning and testing methods.

During training, a set of annotated images 36 is provided (FIG. 5). These may be images for which there is no second channel (IR) information, e.g., RGB images. Or, the IR channel information of the training images is simply ignored. The annotations 68 are assumed to take the form of a ground truth segmentation (pixels are annotated as belonging to a category of interest or not), even though the annotation may have been made at a coarser level, such as for regions of the image.

In the exemplary embodiment, patches are extracted from the visible information 70 of the training images by a patch extractor 72, each patch comprising a group of pixels, and corresponding descriptors 74 are computed by a features extractor 76, based on the RGB values. These descriptors may encode, for example, color and/or texture (gradient) information, e.g., as vectors. The descriptors are extracted by a patch representation generator 78 to form a higher level representation 80 computed for each patch, based on the low level descriptors of the patch. The representation can be for example, a Fisher Vector (FV), as described, for example, in F. Perronnin and C. Dance, "Fisher kernels on visual vocabularies for image categorization," *CVPR*, 2007 and in U.S. Pub. Nos. 20070258648 and 20100189354 (hereinafter, collectively referred to as Perronnin and Dance), although other patch representations are contemplated, as described below. Rather than computing a representation for an entire image, in the present method, a representation is computed for each patch. The patches are labeled by a patch labeler 82 using the available ground truth, and a classifier 34 is learnt on the patch representations and their corresponding labels. For example, one classifier is learned for each class (positive samples being the representations of those patches labeled with the class label, the negative samples being drawn from the other patches). The learning involves learning parameters of a classifier model, such as a linear or non-linear binary classifier, one for each object class. Any binary classifier may be used, such as Sparse Logistic Regression (SLR) (see, for example B. Krishnapuram, L. Carin, M. Figueiredo, and A. Hartemink, "Sparse multinomial logistic regression: Fast algorithms and generalization bounds," IEEE PAMI, 27(6) 957-968 (2005)), support vector machines (SVM), decision trees, and the like. An example of such a method is described, for example, in G. Csurka and F. Perronnin, "An Efficient Approach to Semantic Segmentation," *IJCV*, 2010 (Csurka and Perronnin) and in above-mentioned U.S. Pub. No. 20100040285. As this process is performed on visible images only, an already existing dataset can be used for the training stage.

When computing the unary potential for a test image 16 (S112), each pixel is represented by a surrounding patch, and the same type of descriptor 74 and representation 80 as before is computed for the patch (for example a FV). The representation is given to the learnt classifier(s) 34, which predicts a score 84 for each patch, which is assigned to the corresponding pixels. These scores can be easily transformed into probabilities if not already in that form (see, Csurka and Perronnin and U.S. Pub. No. 20100040285). The patches can be extracted on a grid and/or at multiple scales. For example, at least 100 or at least 1000 and up to 1 million patches are extracted. In one embodiment, the patches can be computed at multiple scales, whereby a pixel can be in more than one patch. The pixel's overall score for each class can then be computed as a function of the scores for the patches in which it is present.

Thus, for each pixel, its probability of belonging to a class of interest, for each of the classes, is known. This is the information that is used in the graph. More precisely, the unary potential of the objective function can be computed as:

$$u_i(l_i) = -\log(p(l_i)) \quad (5)$$

where $p(l_i)$ is the probability value for pixel i to belong to class $l_i$.

As will be appreciated, other functions of the computed probabilities, or the probabilities themselves, may be used as the unary potentials. Additionally, Eqn. (2) could be changed into a maximization problem by making Eqn. (5) positive.

For each possible class (label) to which a pixel can be assigned, the probability of the pixel belonging to that class is computed. Thus, for example, consider the case of two classes, "cup" and "not cup". An example pixel may have been assigned, by the classifier, a probability of 0.61 on a scale of 0-1 of being labeled with "cup." Since there are only two possibilities in this example, its probability of being labeled "not cup" is therefore 0.39. The unary potential for this pixel for the label "cup", according to Eqn. (5), is 0.215 and for "not cup" is 0.409. Since the cup label has a lower unary potential, this favors the pixel being labeled with the label "cup." However, if an adjacent pixel is labeled as "not cup", the pairwise potential is non-zero, i.e., positive, which may result in the final label for this pixel being "not cup" in the overall objective function minimization.

As will be appreciated, other classification methods may be used for categorizing patches of an image, such as those described in U.S. Pub. Nos. 20030021481; 2007005356; 20070258648; 20080069456; 20080240572; 20080317358; 20090144033; 20100040285; 20100092084; 20100098343; 20100226564; 20100191743; 20100189354; 20100318477; 20110040711; 20110026831; 20110052063; 20110091105; U.S. application Ser. No. 12/859,898, and U.S. application Ser. No. 12/890,789, the disclosures of which are incorporated herein by reference in their entireties.

Method 2: Instance Recognition

In another embodiment, the semantic labels can correspond to the labels "relevant" and "non-relevant," according to a given task image. The label relevant, in this embodiment, means that the pixel belongs to a given object instance. The unary energy terms can be provided by an instance likelihood map.

In this embodiment, the segmentation aims at determining whether a specific object is present in the image. In one embodiment, a single instance of this object is provided, such as a picture (visible-only) 38 of that particular object, as a template to guide recognition. As will be appreciated, multiple templates (e.g. the same object in different orientations/lighting/occlusions) could be employed to obtain better recognition in a variety of settings.

Figure 7:
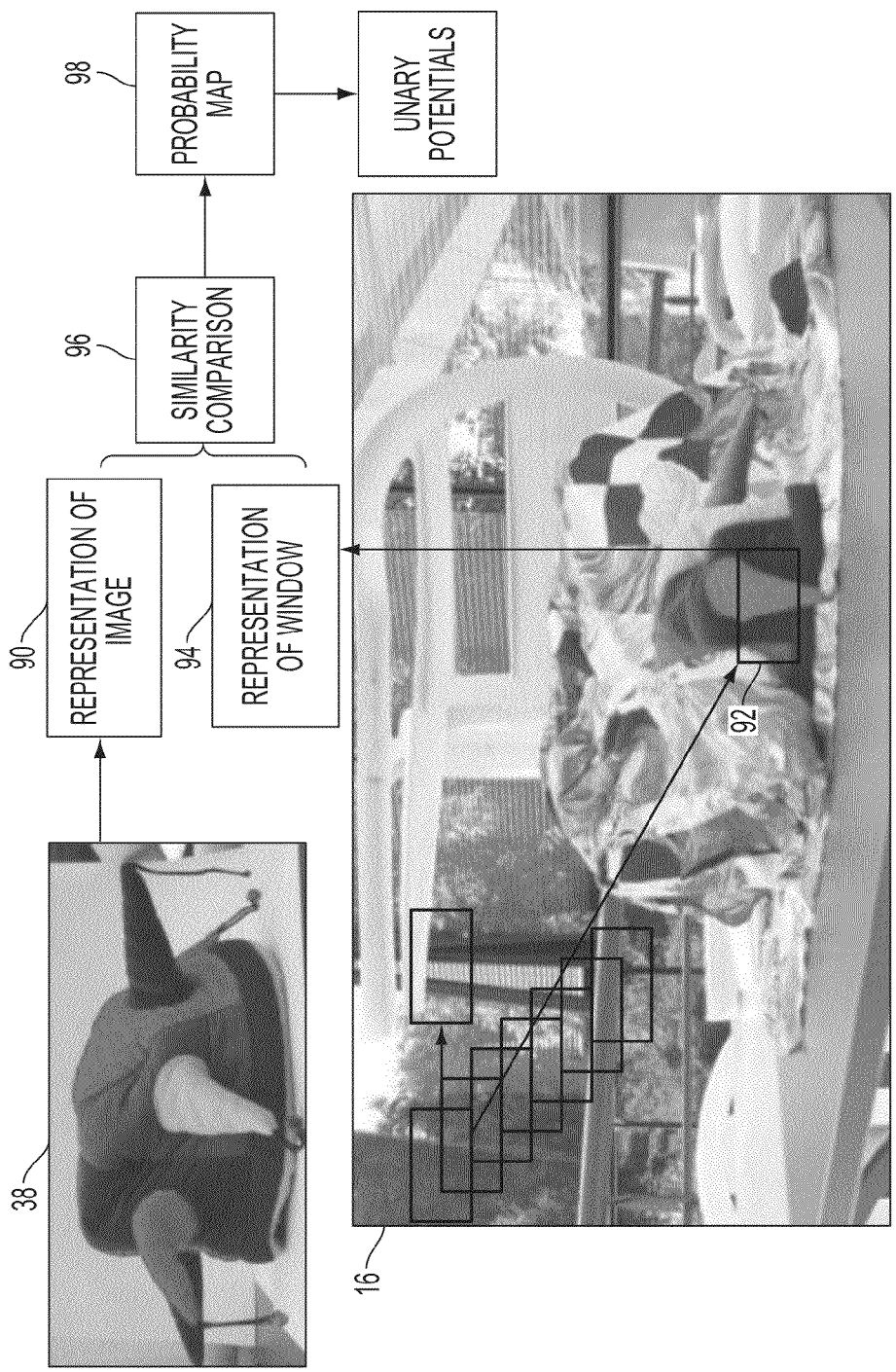
FIG. 7 illustrates the use of a task image to generate unary potentials in the segmentation method of FIG. 3, in accordance with another aspect of the exemplary embodiment.

It is assumed that the unary component 12 is adapted to apply an object instance recognition technique that provides a coarse localization of the object in the image, using only visible information extracted therefrom and the task image(s) 38. Several techniques can be used (correlation between color histograms, interest point matching, and the like). In one embodiment, a technique based on a sliding window and dot product computations is used. First, a representation 90 of the template image 38 is computed (FIG. 7). For example, a representation based on Fisher vectors is computed, according to the methods described in Perronnin and Dance (analogous to the method for determining a patch representation, described above, but in this case, for the image 38 as a whole). Then, for the image 16 to be segmented, a sliding window 92 is moved over many possible object locations in the image and a FV representation 94 is computed for each entire window. A measure of similarity 96 between the two representations (the template one 90, and the current window one 94), captures the similarity between them. In the exemplary embodiment, similarity is computed as the dot product of both representations 90, 94 (which are both vectors). Other methods for computing similarity between vectors are also contemplated, such as the Euclidian distance or Manhattan distance. The similarities 96 extracted from this dense set of windows can be represented using an occupancy probability map 98, which provides a similarity value for each pixel. This is encoded as $p(l_i)$, for each of the two possible labels, and used in the generating the unary potentials, e.g., according to Eqn. (5).

Method 3: Saliency Based Object Segmentation

In another embodiment, the semantic labels correspond to the labels "relevant" and "non-relevant" and are based on saliency. The label "relevant," in this embodiment, means that the pixel belongs to a salient object. The unary potentials can be provided by a salient region detector, e.g. in the form of a foreground (relevant) likelihood map.

In this method, the aim is to identify the most salient object of the entire scene, and to segment it from the background. For this purpose, it is assumed that the unary component 12 is adapted for performing a saliency extraction method. Any method could be used for saliency, based on the visible part of the image. For example, a color-based saliency method is employed as described in Achanta, R. and Hemami, S. and Estrada, F. and Süsstrunk, S., "Frequency-tuned Salient Region Detection, *CVPR*, 2009. Other methods, such as those disclosed in above-mentioned U.S. Pub. No. 20100226564, can also be used.

The saliency method can thus be used as a coarse localization method in visible only, by plugging the output of the saliency detector into the unary term of the objective function. As before, the saliency value of the pixels can be encoded with an occupancy probability map over the pixels, and included in the unary potentials, as in Eqn. (5).

Method 4: User based Object Segmentation

In this embodiment, an interactive system is provided. For example, the system 10 instructs the client device 54 to display the image 16 to be segmented (i.e., the visible part of the image) on a color display device 56, such as an LCD screen. A user defines the object of interest. For example, the user clicks on a couple of points belonging to the object, or draws lines belonging to that object, or roughly draws a line around the border of the object. This location information is received by the system 10. The user interaction can thus replace the recognition part in Method 2. The method can then proceed as for Method 2. For example, a probability (heat) map can be produced by giving higher probability to the pixels closer to the user clicks. Using this probability map as a unary potential, the segmentation problem can be solved in a similar way to the instance based or saliency based methods described above.

Extensions

The above examples focus on using visible and NIR information, principally because it shows the applicability of the method, with information which can be readily captured inexpensively. By using simple changes in the way in which the unary potential is computed, it has been shown that the method can be adapted to different segmentation tasks.

In other embodiments, the following extensions are contemplated:

1. Different graph structures could be defined not only at the pixel level, but using larger elements such as patches or super-pixels. Multi-scale solutions which use a combination of these may also be incorporated into the exemplary model.

2. In the exemplary embodiment, visible information only is used for unary potentials and NIR information only for the pairwise potentials. In other embodiments, both visible and NIR information could be in the unary and/or in the pairwise potentials for improved recognition and segmentation. The best weighting scheme of the contribution of each channel could be learnt on a training set.

3. The objective function could go beyond pairwise potentials, and consider higher order potentials. Such higher order potentials are generally related to more that the values of two pixels at a time (directly or indirectly linked), For example a segment of the image can be considered and a penalization term added if the same label is not assign to all pixels in the segment.

4. Other channels or sources can be incorporated if available (such as full IR, multi-spectral data, data from other types of sensor, etc.), to enhance either the recognition of the object, or its segmentation. In particular other wavelength ranges in the electromagnetic spectrum could be combined with the NIR information used herein if they have a specific response for a material, depth of the object and so on.

Without intending to limit the scope of the exemplary embodiment, the following examples demonstrate the applicability of the method to photographic images.

EXAMPLES

Example 1

Figures 8, 9:
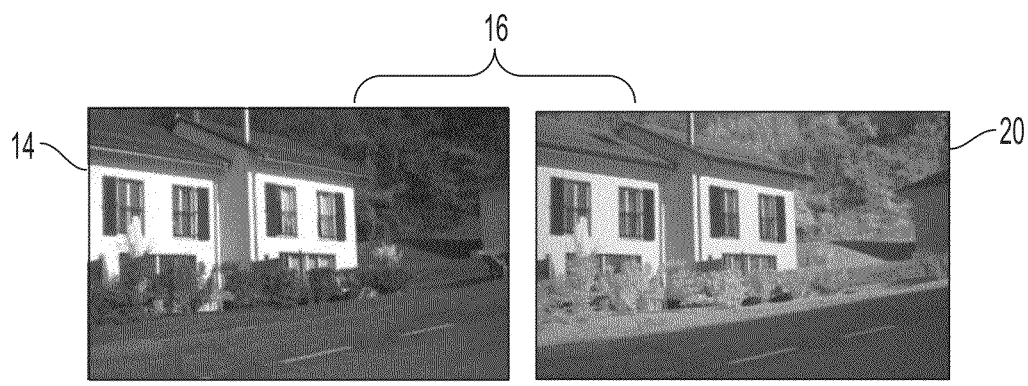
FIG. 8 illustrates an image to be segmented.
FIG. 9 illustrates the NIR portion of the same image.
Figures 10, 11:
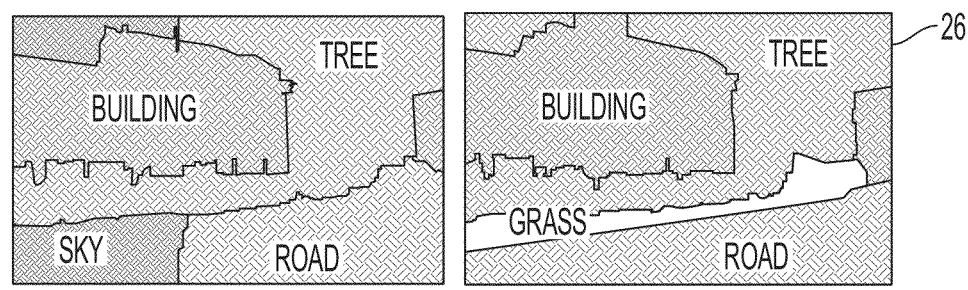
FIG. 10 illustrates segmentation of the image of FIG. 8 using the visible information only.
FIG. 11 illustrates segmentation of the image by the method illustrated in FIGS. 5 and 6, using visible information for the unary potentials and NIR information for the pairwise potentials.

Experiments were performed using Method 1 above on three example images, with the unary potentials computed on the output of a set of classifiers, including classifiers for building, tree, sky, road, and grass. The pairwise potentials were computed based on the NIR information, as discussed above. FIG. 8 shows the original visible image (the original was in color). FIG. 9 shows the corresponding NIR image, using grayscale to represent NIR intensity. FIG. 10 shows the segmentation of the image using visible information only. FIG. 11 shows the segmentation of the image when the exemplary method is used, i.e., using visible for the unary term and NIR in the pairwise term. It can be observed that the NIR information, used only in the pairwise term, enhanced the segmentation results and in particular, the borders of the segments. This is likely due to the material dependency of the different categories which is better captured by the NIR channel.

Example 2

Figure 13:
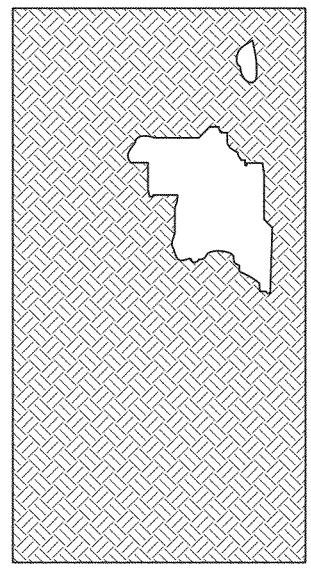
FIG. 13 illustrates segmentation of the same image using visible information for generating the unary potentials and NIR information for generating the pairwise potentials, using the method illustrated in FIG. 7.
Figure 12:
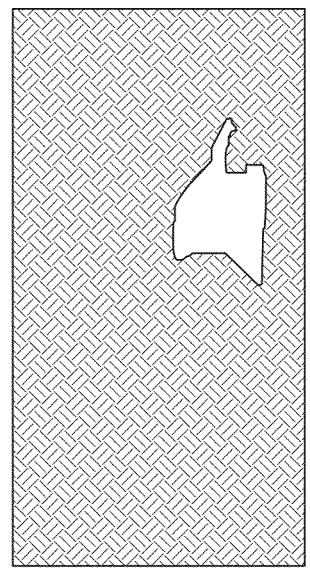
FIG. 12 illustrates segmentation of the test image shown in FIG. 7, using visible information only.

Experiments were performed using Method 2 above. Results for the application of Method 2 to the image 16 shown in FIG. 7 (which was in color), with the illustrated template 38 (which was in color) are shown in FIGS. 12 and 13. In the illustrated example, the image 38 of the hat used as a template has regions of different colors with triangular spikes of different colors extending from them. In the image 16, the colors of the hat are not identical to those visible in the template and the hat is partly occluded. Even in difficult conditions such as these, with a template object appearance that is different from the appearance of the object in the image, the produced segmentations using the exemplary model (with NIR information) (FIG. 12) are significantly better than the visible-only model's segmentations (FIG. 13). The exemplary method is thus able to combine the visible and NIR information to deal with background clutter from colors or patterns.

It is to be expected that improved results could be obtained with a more detailed probability map 98 than the rather crude one used for this example.

Example 3

Figure 14:
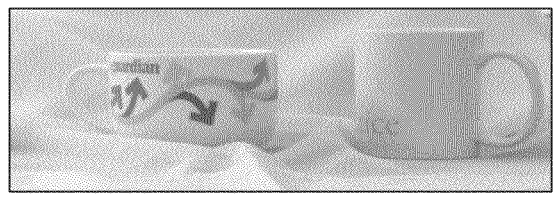
FIG. 14 illustrates an image to be segmented based on saliency.
Figure 15:
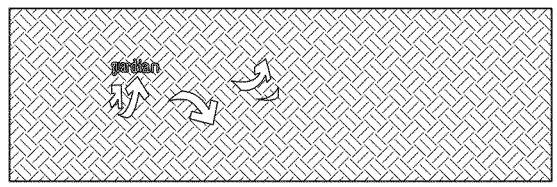
FIG. 15 illustrates the segmentation results based on saliency detection only (based on visible information)
Figure 16:
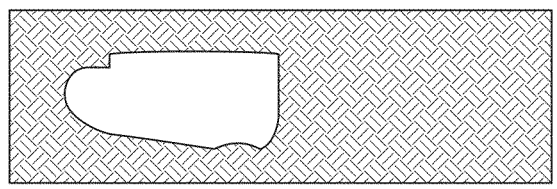
FIG. 16 illustrates the segmentation of the image of FIG. 14 where saliency detection is used to provide the unary potentials and NIR information is used to provide pairwise potentials.

Method 3 was used on an image of a patterned cup and a plain one against a white background (FIG. 14). The visible part of the model (saliency detection) was able to extract colorful patterns on the most salient cup in the image (FIG. 15), but as the cup was primarily white on a white background, the saliency algorithm used alone fails to extract the entire cup, and segments only the colorful pattern on the cup. Using the material specific appearance of the cup in NIR, the segmentation was more accurate with the exemplary full model, segmenting the shape of the cup fairly well (FIG. 16). The exemplary joint model once again is able to achieve much better segmentation, even on a difficult task such as this.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for segmenting an image comprising:
receiving an input image to be segmented; and
with a processor:
for each label in a set of labels, assigning unary potentials to pixels of the input image, the unary potentials being based on information for a first channel in the image;
for each of pairs of labels in the set of labels, assigning pairwise potentials for neighboring pixels of the image, the pairwise potentials being based on information for a second channel in the image, different from the first channel;
optimizing an objective function over pixels of the input image to identify labels for pixels of the image from the set of labels, the objective function being an aggregation of ones of the unary potentials and pairwise potentials; and
segmenting the input image based on the identified labels.

2. The method of claim 1, further comprising outputting the segmented image or information based thereon.

3. The method of claim 1, wherein the first channel is within a first range of the electromagnetic spectrum and the second channel is within a second range of the electromagnetic spectrum.

4. The method of claim 3, wherein the first channel comprises a wavelength range in the visible range of the electromagnetic spectrum and the second channel comprises a wavelength range in the infrared range of the electromagnetic spectrum.

5. The method of claim 1, wherein the first channel comprises only visible information from a visible range of the electromagnetic spectrum.

6. The method of claim 1, wherein the second channel comprises only non-visible information from a non-visible range of the electromagnetic spectrum.

7. The method of claim 1, wherein the unary potentials for a pixel express, for each of the labels in the set of labels, a cost of assigning the label to the pixel, based on the first channel information.

8. The method of claim 1, wherein the pairwise potentials for a pair of neighboring pixels express, for each of the combinations of labels in the set of labels, a cost of assigning the combination of labels to the pair of neighboring pixels, based on the second channel information.

9. The method of claim 1, wherein the assigning pairwise potentials for neighboring pixels comprises defining a graph over pixels of the image in which each pixel is joined by a set of edges to its neighboring pixels, each pixel having at least two neighboring pixels, the edges representing the pairwise potentials between the neighboring pixels.

10. The method of claim 9, wherein each pixel has from 4-8 neighbors in the graph.

11. The method of claim 1, wherein the objective function is optimized by minimizing an optionally weighted sum of terms given at least two labels in the set of labels, a first of the energy terms being based on the unary potentials and a second of the energy terms being based on the pairwise potentials.

12. The method of claim 1, wherein the optimizing of the objective function over pixels of the input image comprises minimizing an objective function of the form:

$$E(L) = \sum_{i \in V} u_i(l_i) + \lambda \sum_{(i,j) \in K} v_{i,j}(l_i, l_j) \qquad (1)$$

where E(L) represents the energy value to be minimized over the set of labels L;

$$\sum_{i \in V} u_i(l_i)$$

represents a unary term, which is a sum over all pixels V of respective unary potentials, each unary potential being represented by a cost $u_i(l_i)$ of assigning a label $l_i$ to a pixel i where $l_i$ is selected from the set of labels L;

$$\sum_{(i,j) \in K} v_{i,j}(l_i, l_j)$$

represents a pairwise term, which is a sum over all pairs of neighboring pixels of respective pairwise potentials, each pairwise potential being represented by a cost $v_{i,j}(l_i,l_j)$ of assigning a label $l_i$ to a pixel i and a label $l_j$, selected from the set of labels L to a neighboring pixel j, where i,j are selected from a set of neighboring pixels; and λ is a weighting parameter.

13. The method of claim 1, wherein the objective function is optimized by an approximation method which computes an approximate joint labeling solution which optimizes the objective function.

14. The method of claim 1, wherein the pairwise potential of neighboring pixels is lowest when the labels of the two pixels are the same and, where the two labels are not the same, the pairwise potential is computed as a function of the difference between observed pixel values in the second channel, such that the pairwise potential decreases as a difference between the observed pixel values in the second channel increases.

15. The method of claim 1, wherein the labels correspond to object classes and the unary energy potentials are based on information provided by classifiers trained on images comprising regions of pixels labeled with labels selected from the set of labels.

16. The method of claim 1, wherein the labels correspond to the labels relevant and non-relevant according to a given task image.

17. The method of claim 1, wherein the labels correspond to the labels salient and non-salient, and the unary potentials are based on the output of a saliency detector on the first channel information of the input image.

18. The method of claim 1, wherein the pixels of the input image each comprise a group of pixels in the input image.

19. A graph-based image segmentation system comprising:

memory which is configured for storing a graphical representation of an input image;

a unary component for assigning unary potentials for pixels of the image over labels from a set of labels, the unary potentials being based on information for a first channel in the image;

a pairwise component for assigning pairwise potentials for neighboring pixels of the image over pairs of labels from the set of labels, the neighboring pixels being defined by the graphical representation, the pairwise potentials being based on information for a second channel in the image, different from the first channel;

a segmentation component for:
- identifying labels for pixels of the image, the labels being selected from a finite set of labels, by optimizing an objective function over pixels of the input image which is based on a combination of the unary and pairwise potentials, and
- segmenting the input image based on the identified labels; and a processor which implements the unary component, pairwise component, and segmentation component.

20. The system of claim 19, further comprising a component for extracting the first and second channel information from the input image.

21. The system of claim 19, wherein the objective function is optimized by minimizing an optionally weighted sum of energy terms given a set of at least two labels, a first of the energy terms being based on the unary potentials and a second of the energy terms being based on the pairwise potentials.

22. A graph-based image segmentation method comprising:

receiving an image to be segmented;

defining a graphical representation of pixels of the image in which pairs of neighboring pixels are identified by edges of the graphical representation;

assigning unary potentials to pixels in the graphical representation, the unary potentials being based on information for a visible channel in the image;

assigning pairwise potentials to the pairs of neighboring pixels of the graphical representation, the pairwise potentials being based on information for an infrared channel in the image;

identifying labels for pixels of the image, the labels being selected from a finite set of labels, by optimizing an objective function over the pixels in the graphical representation, the objective function aggregating ones of the unary potentials and the pairwise potentials, for labels from the set of labels; and segmenting the input image based on the identified labels; and wherein at least one of the defining, assigning unary potentials, assigning pairwise potentials, and identifying labels is performed with a processor.

* * * * *